United States Patent
Marquis

(10) Patent No.: US 7,599,111 B2
(45) Date of Patent: Oct. 6, 2009

(54) METHOD OF AND DEVICE FOR AMPLIFYING A HIGH-ENERGY LASER BEAM WITH NO TRANSVERSE LASING

(75) Inventor: Emmanuel Marquis, Bullion (FR)

(73) Assignee: Thales (FR)

( * ) Notice: Subject to any disclaimer, the term of this patent is extended or adjusted under 35 U.S.C. 154(b) by 0 days.

(21) Appl. No.: 11/314,078

(22) Filed: Dec. 22, 2005

(65) Prior Publication Data

US 2006/0171427 A1    Aug. 3, 2006

(30) Foreign Application Priority Data

Dec. 22, 2004    (FR) .................................. 04 13734

(51) Int. Cl.
*H01S 3/091* (2006.01)
*H01S 3/16* (2006.01)

(52) U.S. Cl. .................................... 359/347; 372/38.06

(58) Field of Classification Search ......... 359/347–349, 359/341.31–341.33, 341.3; 372/70–72, 38.06
See application file for complete search history.

(56) References Cited

U.S. PATENT DOCUMENTS

| | | | |
|---|---|---|---|
| 3,806,829 A * | 4/1974 | Duston et al. ............ | 372/38.01 |
| 4,439,861 A * | 3/1984 | Bradford .................... | 372/25 |
| 4,546,476 A * | 10/1985 | Shaw et al. .................... | 372/6 |
| 5,243,617 A * | 9/1993 | Pocholle et al. ............... | 372/69 |
| 5,646,773 A | 7/1997 | Injeyan et al. | |
| 5,923,684 A * | 7/1999 | DiGiovanni et al. ........... | 372/6 |
| 5,933,271 A * | 8/1999 | Waarts et al. .......... | 359/341.31 |
| 5,991,325 A * | 11/1999 | Ohtomo et al. ............... | 372/69 |
| 6,005,880 A * | 12/1999 | Basting et al. ........... | 372/38.04 |
| 6,556,339 B2 * | 4/2003 | Smith et al. ................. | 359/334 |
| 2004/0074881 A1 * | 4/2004 | Oishi .................... | 219/121.63 |

FOREIGN PATENT DOCUMENTS

FR    2 840 461    12/2003

OTHER PUBLICATIONS

LeBlanc et al. "Compact and efficient multipass Ti:sapphire system for femtosecond chirped-pulse amplification at the terawatt level", Optical Letters, vol. 18, No. 2, pp. 140-142 (Jan. 15, 1993).*

(Continued)

*Primary Examiner*—Eric Bolda
(74) *Attorney, Agent, or Firm*—Lowe Hauptman Ham & Berner, LLP

(57) ABSTRACT

The invention relates to a method of amplifying a laser beam which includes steps consisting in performing an optical pumping of an amplifying crystal so as to inject into the crystal an optical pumping energy $E_{total}$, amplifying the laser beam by means of the amplifying crystal and an optical system with N passes, that is, designed to inject the laser beam into the amplifying crystal N times, N being an integer>1. The optical pumping is temporally divided into n partial pumpings, the optical energy of a partial pumping being a fraction of $E_{total}$, n being an integer $2 \leq n \leq N$ and in that the laser beam is injected into the amplifying crystal at least once after each partial pumping.

6 Claims, 5 Drawing Sheets

OTHER PUBLICATIONS

Petit, S. et al., "A Tunable Femtosecond Pulses Amplifier", Optics Communications, North-Holland Publishing Co. Amsterdam, NL, vol. 124, No. 1, Feb. 15, 1996, pp. 49-55, XP004021614, ISSN: 0030-4018.

Sweetser, J. et al., "Efficient High Repetition Rate Synchronous Amplification of a Passively Mode-Locked Femtosecond Dye Laser", Applied Optics, Optical Society of America, Washington, US, vol. 32, No. 24, Aug. 20, 1993, pp. 4471-4479, XP000388171, ISSN: 0003-6935.

U.S. Appl. No. 07/916,847, filed Dec. 17, 1991.

* cited by examiner

METHOD OF AND DEVICE FOR AMPLIFYING A HIGH-ENERGY LASER BEAM WITH NO TRANSVERSE LASING

TECHNICAL FIELD

The field of the invention is that of the amplification of a high-energy laser beam and the associated optical pumping.

The rise in energy and average power of peak high power pulsed lasers, of the titanium-doped sapphire type, is leading to the use of large diameter amplifying crystals requiring optical pumping energies that can exceed 100 joules per laser firing. The peak powers of these lasers are normally measured between terawatts and petawatts.

BACKGROUND OF THE INVENTION

The theory of operation of a laser beam amplification device is reviewed briefly below. The latter is illustrated in FIG. 1a. It mainly comprises a laser beam amplifying crystal 1 and optical pumping laser beams 3. The beams 3 inject optical energy into the amplifying crystal. The laser source originating the pumping beams is not shown in the figure. Then, the laser beam to be amplified 2 passes through the crystal of the amplifier a number of times by means of mirror-based optical devices 21. On each pass, it extracts a portion of the energy injected in the pumping and is thus amplified in the crystal. Generally, the number of passes is between 2 and 8, as long as the energy contributed by the pumping beams 3 is not totally extracted by the laser beam 2. Thus, the extraction of the energy contributed by the pumping beams 3 is improved.

In this type of laser beam amplification device configuration, a spurious phenomenon known as transverse lasing appears between the deposition of energy in the crystal by optical pumping and its extraction by the beam to be amplified. This phenomenon is linked to the creation in the crystal of a laser subcavity along an axis transversal to the pumping axis, that is, between two areas of the surface linking the input and output faces of the crystal: it greatly affects the efficiency of the amplification device. The transverse lasing occurs between areas of the crystal when the oscillation condition of the duly created subcavity is satisfied, that is, when there is conservation of the energy on a round trip from the centre C to the edge, as illustrated in FIG. 1b.

This means that the transverse lasing appears between two areas of the surface or the circumference linking the input and output faces of the crystal when: $G_T \cdot R > 1$.

$G_T$ being the transverse gain of the crystal, and R being the reflection coefficient at an interface separating the circumference of the crystal from the outside.

Conventionally, R is:

$$R = \left[\frac{\Delta n}{\Sigma n}\right]^2$$

with $\Delta n$: difference in optical indices between the crystal and the outside $\Sigma n$: sum of the optical indices of the crystal and of the outside.

In practice, the transverse lasing appears for $G_T \cdot R > 0.2$ and firstly on the faces of the crystal that are exposed to the pumping which present the greatest gain, that is, those that absorb most of the pumping energy.

The current techniques for combating the transverse lasing consist in minimizing the reflection coefficient R. They are based on the use of materials with matched index as external coating for the crystal. The duly created index matching limits the reflections at the edge of the crystal and prevents the appearance of transverse lasing.

However, as described previously, the crystal receives high pumping energy. This induces in the crystal thermal effects which impair the efficiency of the amplification device. These crystals must therefore be cooled.

However, the index matching materials used to combat the transverse lasing present the following defect. They are poor conductors of heat and cooling of the crystal is impaired.

SUMMARY OF THE INVENTION

A major object of the invention is therefore to use a method of amplification so as to obtain both a high quality amplified laser beam and minimized transverse lasing effects.

The principle of the invention rests on a method of controlling the transverse gain $G_T$.

To achieve this object, the invention proposes a method of amplifying a laser beam which includes steps consisting in:

performing an optical pumping of an amplifying crystal so as to inject into the crystal an optical pumping energy $E_{total}$, amplifying the laser beam by means of the amplifying crystal and an optical system with N passes, that is, designed to inject the laser beam into the amplifying crystal N times, N being an integer greater than 1.

It is mainly characterized in that the optical pumping is temporally divided into n partial pumpings, the optical energy of a partial pumping being a fraction of $E_{total}$, n being an integer $2 \leq n \leq N$, and in that the laser beam is injected into the amplifying crystal at least once after each partial pumping.

The transverse gain increases as a function of the optical pumping energy. A temporal distribution of the pumping energy contributions is used to limit the partial pumping energies and therefore to limit $G_T$. The transverse lasing is consequently minimized, even eliminated, without reducing the final energy of the beam to be amplified.

According to a characteristic of the invention, $\Delta T_{pass}$ being the duration of a pass of the laser beam in the optical system, this duration being determined by the geometry of the optical system, and $\Delta T_{pumping}$ being the time interval between two pumpings, the following applies:

$\Delta T_{pumping} = k \cdot \Delta T_{pass}$, $k$ being an integer $\geq 1$.

According to another characteristic of the invention, the partial pumpings are obtained from a number of optical pumping sources such as optical pumping lasers.

The amplifying crystal is, for example, based on titanium and sapphire.

Another object of the invention is a device for amplifying a laser beam comprising at least one amplifying crystal, an optical system with N passes, that is, designed to inject the laser beam into the amplifying crystal N times, N being an integer>1, and a device for optical pumping by at least two pumping laser beams passing through the amplifying crystal. It is characterized in that it includes a synchronization device designed to temporally distribute the triggering of the pumping laser beams before at least one pass of the laser beam in the amplifying crystal.

According to an embodiment of the invention, N=4, and the synchronization device is designed to trigger a pumping laser before the first and then before the third pass of the beam to be amplified in the crystal.

BRIEF DESCRIPTION OF THE DRAWINGS

Other characteristics and advantages of the invention will become apparent from reading the detailed description that follows, given as a nonlimiting example and with reference to the appended drawings in which.

DETAILED DESCRIPTION

There now follows a description of the transverse gain calculation.

Each time the beam passes through the crystal, the value of the amplification gain G is equal to the ratio of the output energy $E_{OUT}$ to the input energy before amplification $E_{IN}$.

The output energy $E_{OUT}$ of the laser beam at the output of the amplifier is given by the Frantz and Nodvik equation. It is:

$$E_{OUT} = J_{SAT} \cdot S \cdot \ln\left[\frac{J_{STO}}{J_{SAT}} \cdot \left(e^{\frac{E_{IN}}{S \cdot J_{SAT}}} - 1\right) + 1\right]$$

with $E_{IN}$: input energy before amplification;
$J_{STO}$: stored fluence available for amplification gain;
$J_{SAT}$: crystal saturation fluence;
S: laser beam surface area.

There is also:

$J_{IN}$: input fluence before amplification with $$J_{IN} = \frac{E_{IN}}{S}.$$

When $J_{IN}$ is very much less than $J_{SAT}$, the above equation is simplified. In this case, the value of the amplification gain G which is equal to the ratio of the output energy $E_{OUT}$ to the input energy before amplification $E_{IN}$ is:

$$G = e^{\frac{J_{STO}}{J_{SAT}}}$$

Moreover, $G = e^{g_0 \cdot l}$ $g_0$ being the gain per unit length of the amplifying crystal and l being the length of the pumped crystal.

From this, $g_0$ is deduced:

$$g_0 = \frac{J_{STO}}{l \cdot J_{SAT}}$$

Figure 1A:
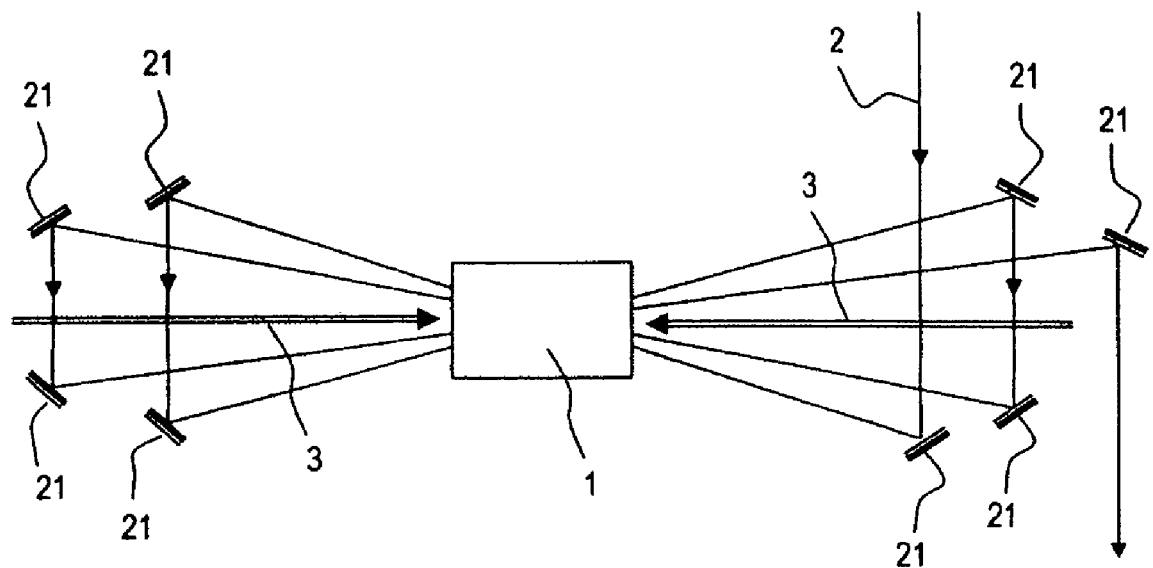
FIG. 1, already described, represents the schematic diagram of a laser beam amplification device.
FIG. 1b, already described, illustrates a round trip of a transverse laser beam, from the centre C to the edge of the crystal shown in cross section.
Figure 1B:
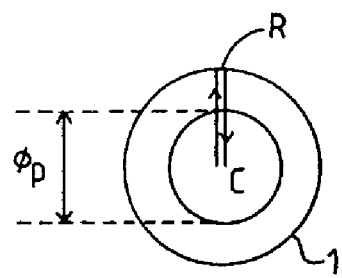

It is demonstrated that the transverse gain $G_T$ is:

$$G_T = e^{g_0 \cdot \Phi_p}$$

with $\Phi_p$ being the diameter of the pump laser beam indicated in FIG. 1b.

We then obtain for $G_T$:

$$G_T = e^{\frac{J_{STO}}{J_{SAT} \cdot l} \cdot \Phi_p}$$

For each pass of the laser beam in the crystal, we obtain:

$$J_{STO}(n) = J_{STO}(n-1) - J_E(n)$$

With $J_{STO}(n)$ being the fluence stored in the crystal which remains available on the nth pass of the beam and $J_E(n)$ being the fluence extracted in this pass.

Figure 2:
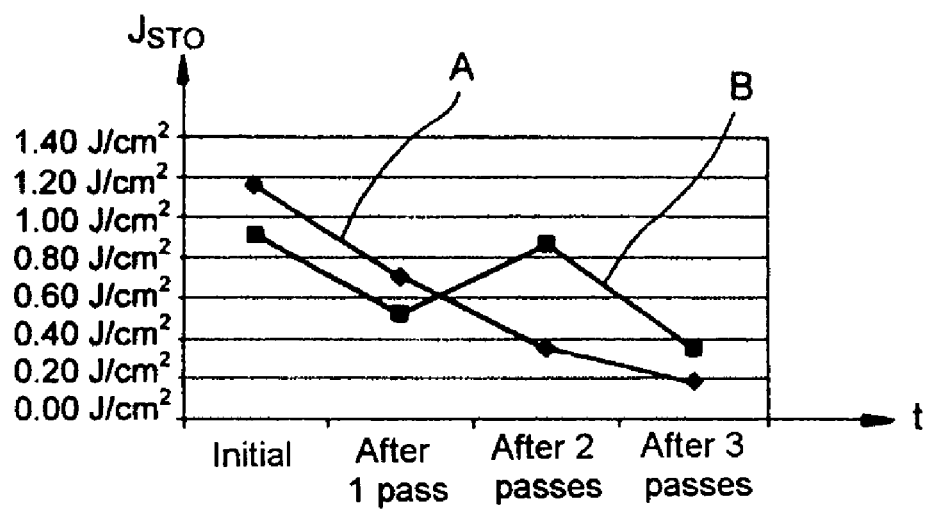
FIG. 2 diagrammatically represents the trend over time of the fluence stored $J_{STO}$ in the amplifying crystal, initially and after 1, 2 then 3 passes, in a conventional case (A) and according to the invention (B)
Figure 3:
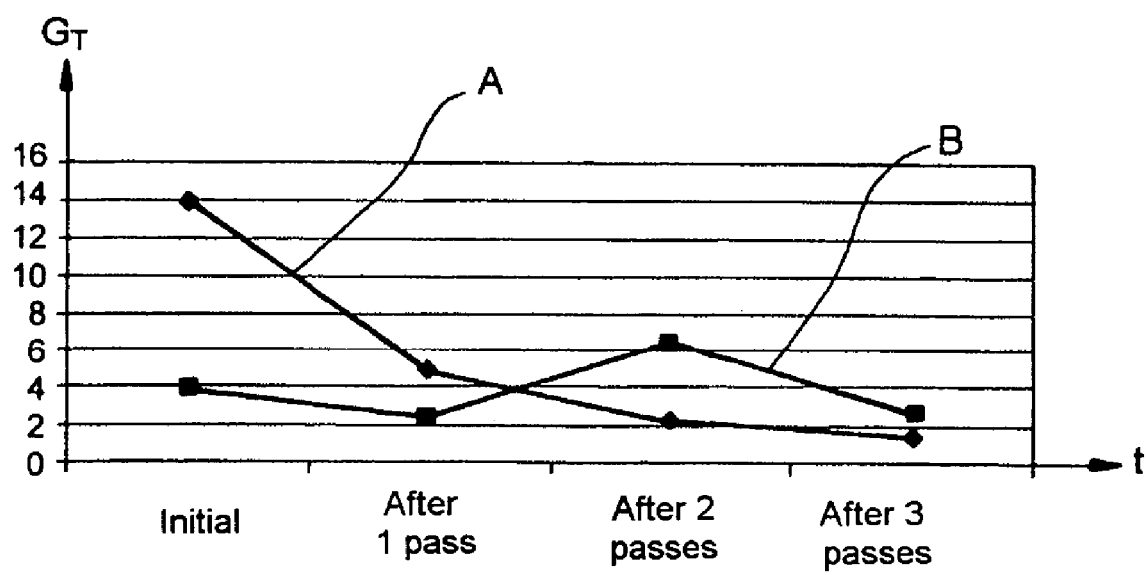
FIG. 3 diagrammatically represents the trend over time of the transverse gain $G_T$ in the amplifying crystal, initially and after 1, 2 then 3 passes, in a conventional case (A) and according to the invention (B)

The conventional configuration creates a maximum $J_{STO}$ value on the first pass which simply decreases on subsequent passes, as illustrated in the curve A of FIG. 2. This configuration therefore creates a maximum transverse gain $G_T$ before the first pass, as illustrated in curve A of FIG. 3, which favours the appearance of the transverse lasing.

Furthermore, the transverse gain $G_T$ is not uniformly distributed along the crystal as will now be seen.

We have: $J_{STO} = E_{STO}/S$, with $E_{STO}$ being the stored energy available for the amplification gain and S being the surface area of the pumping laser beam.

It is also demonstrated that:

$$E_{STO} = E_{PUMP} \cdot \alpha \cdot l \cdot \frac{\lambda_{pump}}{\lambda_{laser}}$$

with $E_{PUMP}$ being the energy contributed by the pumping laser, $\alpha$ being the absorption coefficient per unit length of the pumping beam, l being the length of the pumped crystal, $\lambda_{PUMP}$ and $\lambda_{LASER}$ being the wavelengths of the pumping laser beam and the amplified laser beam; the ratio of these wavelengths corresponds to the quantum efficiency of the amplifying crystal. For example, for a crystal made of titanium-doped sapphire, for which the pumping beam has a wavelength $\lambda_{PUMP}$ of 532 nanometres and the amplified laser beam has a wavelength $\lambda_{LASER}$ of 800 nanometres, the quantum efficiency is 0.665.

The stored energy $E_{STO}$ is not stored uniformly along the crystal. It is demonstrated that the variation in energy absorbed $E_{ABS}(x)$ along the crystal in the direction Ox is:

$$E_{ABS}(x) = (1 - e^{-\alpha \cdot x})$$

Figure 4:
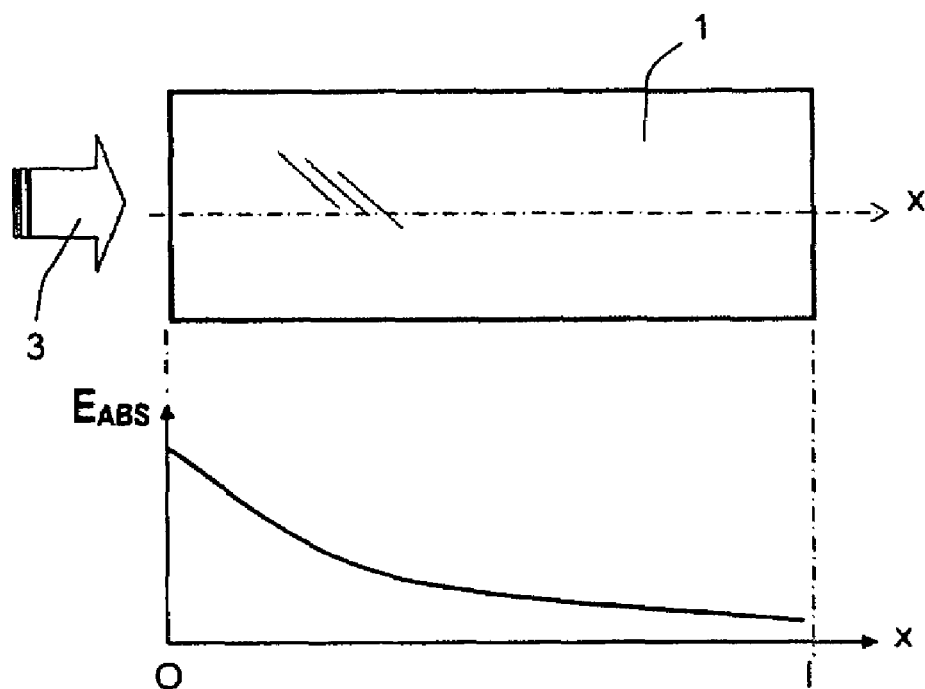
FIGS. 4 and 5 diagrammatically represent the variation in energy absorbed by the amplifying crystal along its axis.
Figure 5:
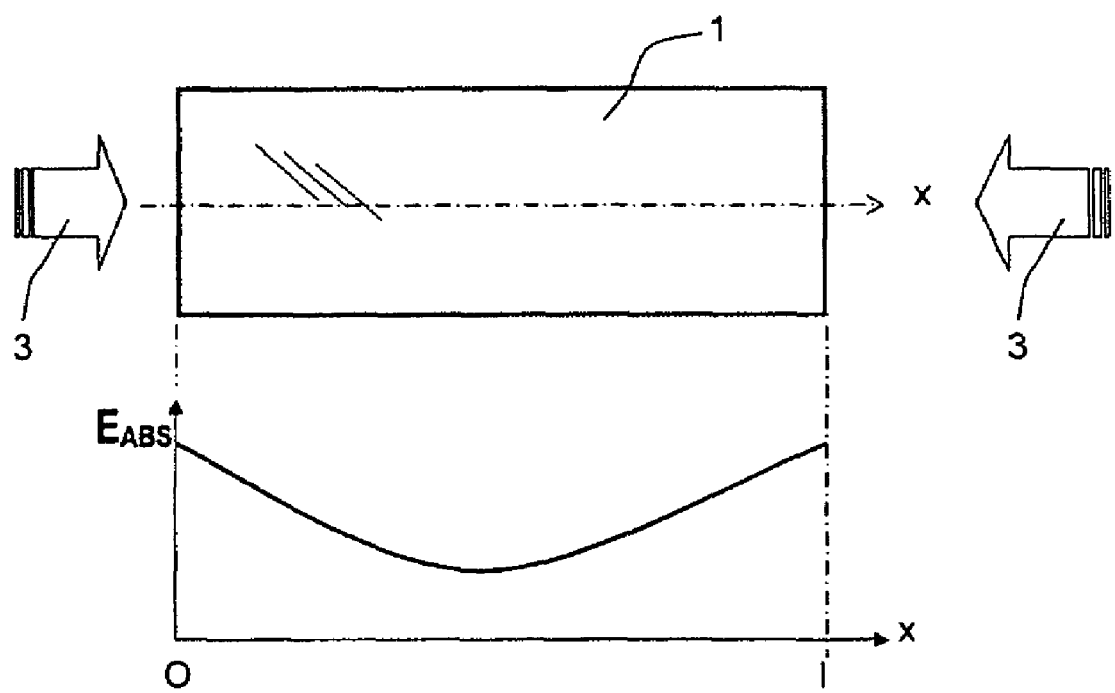

FIGS. 4 and 5 represent the variation of the energy absorbed $E_{ABS}$. In FIG. 4, a single pumping beam 3 passes through the crystal 1. In this case, the distribution of absorbed energy diminishes constantly from one end of the crystal to the other. In FIG. 5, two opposing pumping beams 3 pass through the crystal 1. In this case, of course, the distribution of absorbed energy is symmetrical and the energy variations are attenuated. However, the ends of the crystal still contain more absorbed energy than its central part. Consequently, since $J_{STO}$ is proportional to $E_{ABS}$, the transverse gain $G_T$ is greater at the ends of the crystal than at its middle, so favouring the transverse lasing effects in the end parts of the crystal, near the input and output faces.

The method according to the invention is based on a temporal distribution of the pumping energy contributions so as to reduce the highest value of $J_{STO}$, in this case the initial $J_{STO}$, in particular at the ends of the crystal. Consequently, the transverse gain, which increases as a function of $J_{STO}$, is also reduced.

Assuming that the energy contributions are distributed 1 times, we then obtain:

$$J_{STO}(n) = J_{STO}(n-1) - J_E(n) + J_{PUMP}(i).$$

With: $J_E(n)$ being the fluence extracted in the nth pass of the beam in the crystal, n being an integer varying from 1 to N, $J_{PUMP}(i)$ being the pumping fluence contributed in the ith energy contribution, i being an integer variant from 1 to 1, 1<N, also designated partial pumping fluence.

The trend of $J_{STO}$ according to the invention is illustrated in curve B of FIG. 2, in the case of an energy contribution distributed twice, a first time before the first pass and a second time between the first and second passes: $J_{STO}$ always remains significantly lower than the initial value of the prior art.

We also obtain:

$$J_{STO}(\text{Total}) = \sum_i J_{PUMP}(i) \text{ and, naturally, } J_{STO}(n) < J_{STO}(\text{Total})$$

The limiting of $J_{STO}(n)$ thus limits $G_T$ and so reduces the product $G_T \cdot R$. The transverse lasing is consequently minimized, even eliminated. The trend of $G_T$ according to the invention is illustrated in curve B of FIG. 3: $G_T$ always remains clearly lower than the initial value of the prior art.

The above reasoning applies in the same way when the term fluence is replaced by the term energy.

In the same way as the sum of the partial pumping fluences is equal to the total stored fluence, the sum of the partial pumping energies is equal to the total pumping energy $E_{total}$.

The partial pumping energies can be the same ($J_{PUMP}(i) = J_{PUMP}(i+1)$), increasing ($J_{PUMP}(i) < J_{PUMP}(i+1)$) or decreasing ($J_{PUMP}(i) > J_{PUMP}(i+1)$).

The partial pumping contributions are preferably performed when the beam to be amplified is outside the crystal, that is, during its pass through the optical system. Furthermore, since $\Delta T_{pass}$ is the duration of a pass in the optical system determined by the geometry of the optical system, and $\Delta T_{pumping}$ is the time interval between two partial pumpings, we obtain:

$$\Delta T_{pumping} = k \cdot \Delta T_{pass}, \; k \text{ being an integer} \geq 1.$$

Figure 6:
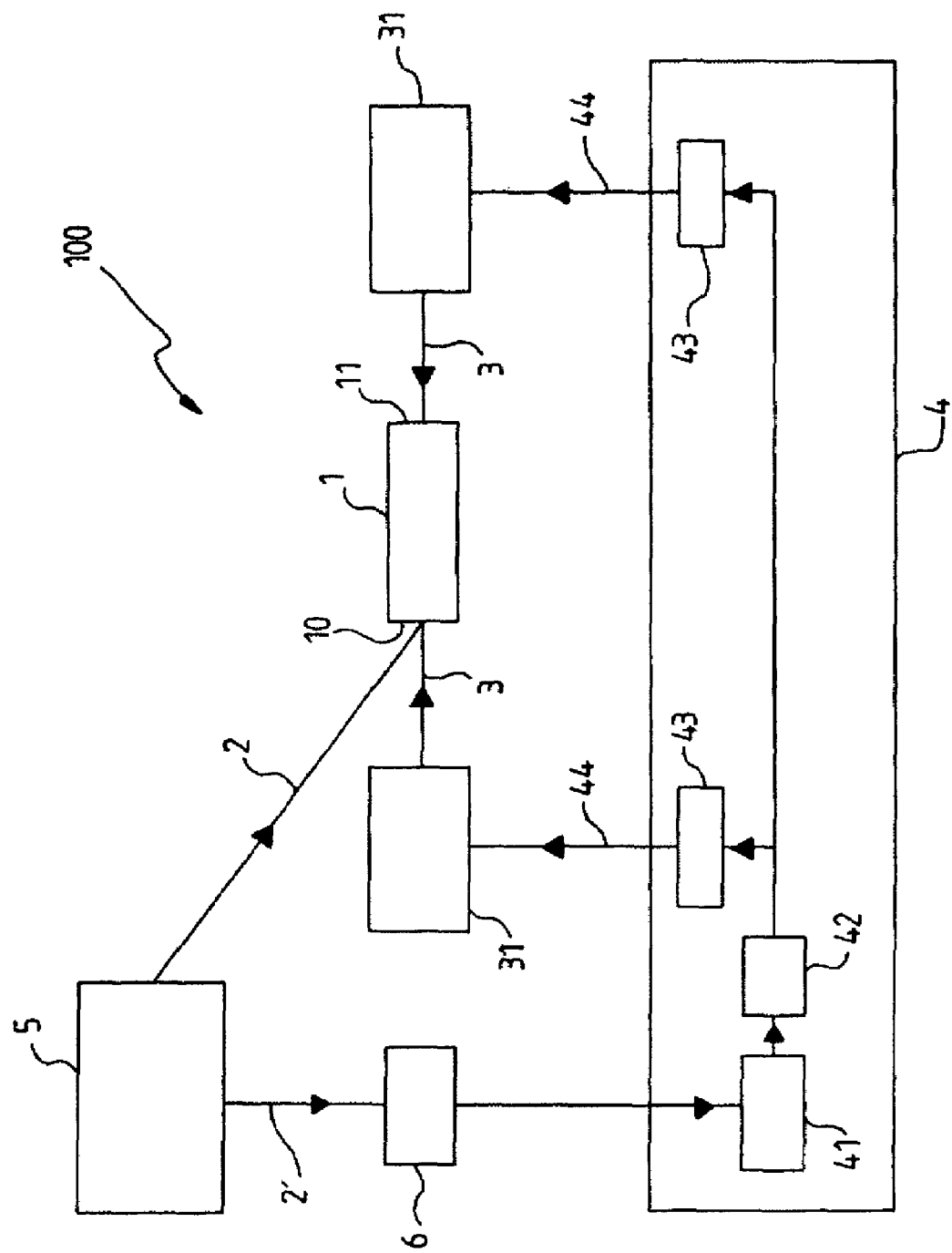
FIG. 6 diagrammatically represents a laser beam amplification device according to the invention.

There now follows a description in relation to FIG. 6, of a laser beam amplification device 100 according to the invention.

It includes a laser oscillator 5 designed to emit the laser beam 2 to be amplified.

It includes an amplifying crystal 1 having the shape of a straight cylinder with an input face 10 and an output face 11, circular in shape, the amplified laser beam circulating between said faces; the material of the amplifying crystal is a material suited to optical pumping. Typically, it is made of titanium and sapphire. It also includes an optical system with N passes, that is, designed to inject the laser beam into the amplifying crystal N times: this system is not shown in this figure, to avoid cluttering the figure.

It also includes an optical pumping device by at least two pumping laser beams 3 passing through the amplifying crystal 1. The pumping beams 3 are produced by lasers 31. In the figure, two lasers 31 are shown.

According to a particular embodiment of the invention, the pumping of the crystal is performed longitudinally, that is, the pumping beams are propagated in a direction roughly parallel to the generatrix of the cylinder forming the crystal. Of course, the pumping beam has a circular shape to be well suited to the shape of the crystal. Furthermore, the energy distribution inside the pump laser beam is constant.

It also includes a synchronization device 4 designed to temporally distribute the triggering of the pumping laser beams 3 before at least one pass of the laser beam 2 in the amplifying crystal 1. This is, for example, a master clock type synchronization device.

This synchronization device 4 is linked to the laser oscillator 5 via a radio-frequency detector 6 such as a photodiode. This detector 6 is intended to detect a small portion 2' of the laser beam 2 emitted by the oscillator 5. The synchronization device includes, for example, a noise filtering element 41, linked to a divider 42 used to align the frequency of the laser oscillator (typically varying between 20 MHz and 100 MHz) with that of the amplifier (typically varying between 10 Hz and 10 kHz). The divider 42 is linked to at least two delay lines 43. Each of these delay lines is intended to output a signal 44 triggering the emission of the pumping laser 3 by the laser 31 to which it is linked. From one delay line to the other, this signal 44 is temporally offset. In the example of the figure, the synchronization device includes two delay lines 43.

The following results were obtained using an amplification device with 4 passes (N=4), equipped with a round section Ti:Sa crystal rod and two pumping lasers, of equal energy.

Figure 7A:
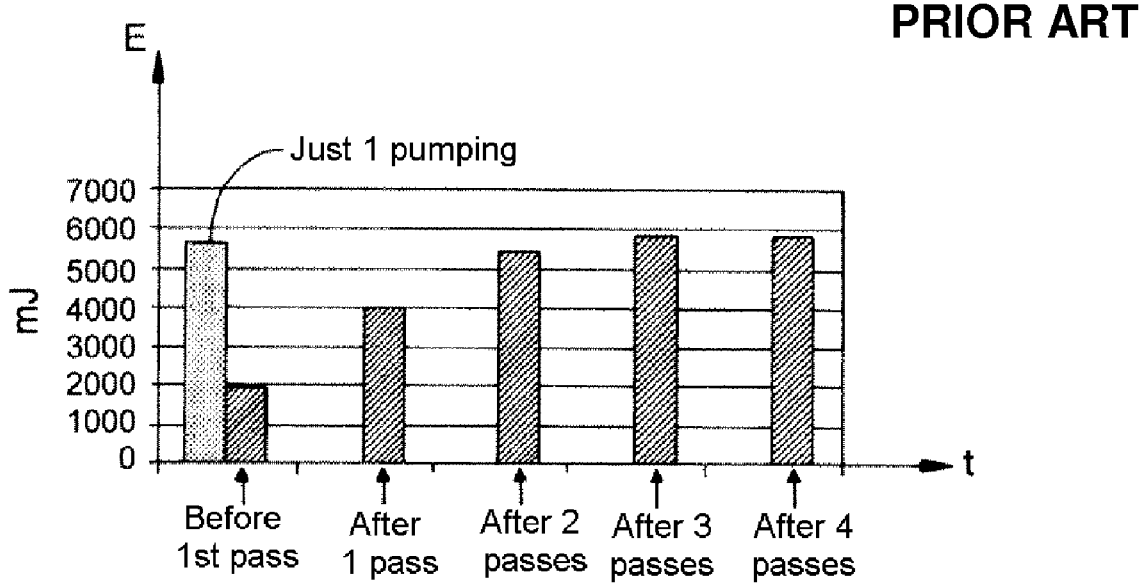
FIG. 7a diagrammatically represents a bar chart of the energy of the initial pumping beam and of the trend over time of the laser beam to be amplified, initially and after 1, 2, 3 then 4 passes, in a conventional case.
Figure 7B:
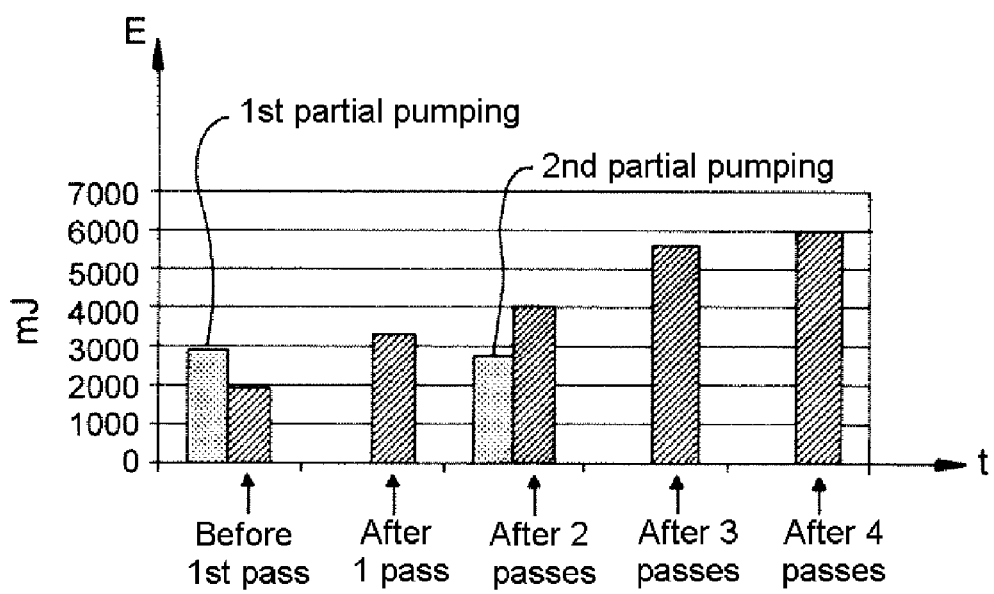
FIG. 7b diagrammatically represents a bar chart of the energy of the partial pumping beams and the trend over time of the laser beam to be amplified, initially and after 1, 2, 3 then 4 passes, according to the invention.

The trend over time of these energies according to a conventional operation or according to the invention are respectively shown in FIGS. 7a and 7b. The energy before the first pass is the initial energy of the laser beam to be amplified. In the first case, both lasers are conventionally triggered before the first pass of the beam in the crystal and thus release an initial pumping energy equal to the total pumping energy; in the second case, a first laser is triggered before the first pass and a second laser between the second and third passes, each releasing a partial pumping energy equal to half the total pumping energy. The final energy of the beam to be amplified, in this case the energy after its fourth pass in the crystal, is virtually the same in both cases.

Comparable results can be obtained with a square section Ti:Sa amplifying crystal rod.

The method according to the invention can thus be used to reduce the risks of transverse lasing without reducing the final energy of the beam to be amplified.

According to another embodiment, the or each pumping laser is triggered with a temporal offset, the energy of each laser being partially released on each triggering.

The invention claimed is:

1. A device for both amplifying a laser beam and minimizing a transverse lasing comprising:
    an amplifying crystal;
    an optical system with N passes, adapted to inject the laser beam into the amplifying crystal N times, N being an integer greater than 1; and
    an optical pumping device including at least two lasers to emit pumping laser beams to pass through the amplifying crystal, and a synchronization device configured to temporally distribute the triggering of the pumping laser beams before one and then before at least another passes of the laser beam to be amplified in the crystal.

2. The amplification device according to claim 1, wherein N=4, and the synchronization device is designed to trigger a pumping laser before the first and then before the third pass of the beam to be amplified in the crystal.

3. The amplification device according to claim 1, wherein the amplifying crystal is a titanium-doped sapphire crystal.

4. The amplification device according to claim 1, wherein the amplifying crystal is a rod with a round or square section.

5. A device for amplifying a laser beam, said device comprising:
    an amplifying crystal;
    an optical system with N passes, adapted to inject the laser beam into the amplifying crystal N times, N being an integer greater than 1; and
    an optical pumping device including at least two lasers to emit pumping laser beams to pass through the amplifying crystal in a direction parallel to a longitudinal axis of the amplifying crystal; and
    a synchronization device connected to a laser oscillator via a radio frequency detector, said synchronization device comprising:
    a noise filtering element;
    a divider connected to the noise filtering element;
    at least two delay lines in connection with the divider, wherein
        said each delay line is adapted to output a signal to the respective laser for triggering an emission of the pumping laser beam; and
        the signal from one of said delay lines is temporally offset relative to the signal from the other thereby reducing a transverse lasing.

6. The device according to claim 5, wherein said synchronization device is configured to temporally distribute the triggering of the pumping laser beams before at least one pass of the laser beam in the amplifying crystal.

* * * * *